(12) United States Patent
Matten

(10) Patent No.: US 9,319,874 B2
(45) Date of Patent: Apr. 19, 2016

(54) AUTOMATIC CHANNEL PASS-THROUGH

(75) Inventor: Alan H. Matten, Chicago, IL (US)

(73) Assignee: Wi-LAN Inc., Ottawa, Ontario (CA)

( * ) Notice: Subject to any disclaimer, the term of this patent is extended or adjusted under 35 U.S.C. 154(b) by 504 days.

(21) Appl. No.: 12/592,445

(22) Filed: Nov. 25, 2009

(65) Prior Publication Data

US 2011/0122777 A1    May 26, 2011

(51) Int. Cl.
  *G01R 31/08*    (2006.01)
  *H04W 12/02*   (2009.01)
  *H04W 88/18*   (2009.01)
  *H04L 29/06*    (2006.01)

(52) U.S. Cl.
  CPC .............. *H04W 12/02* (2013.01); *H04L 65/103* (2013.01); *H04L 65/605* (2013.01); *H04W 88/181* (2013.01); *H04L 65/1043* (2013.01)

(58) Field of Classification Search
  USPC .......... 370/252, 352, 353, 354, 355, 356, 465
  See application file for complete search history.

(56) References Cited

U.S. PATENT DOCUMENTS

| | | | | |
|---|---|---|---|---|
| 5,920,834 | A * | 7/1999 | Sih et al. | 704/233 |
| 6,069,947 | A * | 5/2000 | Evans et al. | 379/229 |
| 6,785,261 | B1 * | 8/2004 | Schuster et al. | 370/352 |
| 7,227,888 | B2 * | 6/2007 | Lemieux | 375/221 |
| 7,333,805 | B2 * | 2/2008 | Oestreich | 455/423 |
| 7,636,711 | B2 * | 12/2009 | Rizzi et al. | |
| 7,729,332 | B2 * | 6/2010 | Mekala et al. | 370/347 |
| 7,747,017 | B2 * | 6/2010 | Valentine et al. | 380/244 |
| 2002/0103003 | A1 * | 8/2002 | Mauro, II | 455/552 |
| 2002/0147030 | A1 | 10/2002 | Chun et al. | |
| 2003/0063569 | A1 * | 4/2003 | Kalliokulju et al. | 370/252 |
| 2005/0025302 | A1 | 2/2005 | Schmid et al. | |
| 2007/0019581 | A1 | 1/2007 | Mekala et al. | |
| 2008/0273504 | A1 * | 11/2008 | Foley | 370/337 |
| 2010/0070285 | A1 * | 3/2010 | Kim et al. | 704/500 |

FOREIGN PATENT DOCUMENTS

WO  WO 2006/060637  6/2006
WO  WO 2009/039676  4/2009

OTHER PUBLICATIONS

Internet Citation; Intersystem Link Protocol (3GPP2 N.S0019; Version 1.0.0); Jan. 28, 2000; p. 18PP; XP007918508; Retrieved from the Internet: URL:www.3gpp2.org/public_html/specs/N.S0019-0_v1.0.pdf; Retrieved on May 4, 2011; whole document.

* cited by examiner

*Primary Examiner* — Ricky Ngo
*Assistant Examiner* — Christine Ng
(74) *Attorney, Agent, or Firm* — Volpe and Koenig, P.C.

(57) ABSTRACT

A network infrastructure device of an apparatus in one example comprises a receive interface and a transmit interface for a communication channel. The network infrastructure device is configured to pass a data stream for the communication channel from the receive interface, through a set of signal processing blocks, and to the transmit interface. The network infrastructure device is configured to analyze the data stream for an occurrence of a predetermined data pattern. The network infrastructure device is configured to automatically add and/or remove one or more signal processing blocks from the set of signal processing blocks upon the occurrence of the predetermined data pattern.

26 Claims, 2 Drawing Sheets

AUTOMATIC CHANNEL PASS-THROUGH

TECHNICAL FIELD

The invention relates generally to telecommunications and more particularly to processing data streams in a telecommunication network.

BACKGROUND

Intersystem Link Protocol (ISLP) datagrams represent a form of encrypted data, typically used for secure voice communications. When ISLP data is transmitted in a data stream across a bearer network, other network infrastructure devices in the bearer network that may process the data stream must be informed so that they don't process the data and corrupt the encrypted ISLP datagrams. The devices can be externally controlled to start a "clear-channel" mode of operation without processing of the data.

Existing solutions are able to provide guidance via control/signaling messages sent out of band to the network infrastructure devices where the ISLP protocol is implemented to direct when to enable/disable clear-channel support. The control/signaling messages will then be processed, and signal processing blocks such as Echo Cancellation (EC) and Voice Quality Enhancement (VQE) modules can be disabled. However, in internet protocol (IP) networks, there are potentially multiple network infrastructure devices in the network that do not have any knowledge of the content in the data stream, and are not communicated to/with the control/signaling messages. Therefore, there is no way to inform these network infrastructure devices of their need to enter/exit a clear-channel mode of processing.

SUMMARY

The invention in one implementation encompasses an apparatus. The apparatus comprises a network infrastructure device with a receive interface and a transmit interface for a communication channel. The network infrastructure device is configured to pass a data stream for the communication channel from the receive interface, through a set of signal processing blocks, and to the transmit interface. The network infrastructure device is configured to analyze the data stream for an occurrence of a predetermined data pattern. The network infrastructure device is configured to automatically add and/or remove one or more signal processing blocks from the set of signal processing blocks upon the occurrence of the predetermined data pattern.

Another implementation of the invention encompasses a method. A data stream for a communication channel is passed from a receive interface, through a set of signal processing blocks, and to a transmit interface. The data stream is analyzed for an occurrence of a predetermined data pattern. One or more signal processing blocks are automatically added or removed from the set of signal processing blocks upon the occurrence of the predetermined data pattern.

A further implementation of the invention encompasses an article. The article comprises one or more computer-readable signal-bearing media. The article comprises means in the one or more media for passing a data stream for a communication channel from a receive interface, through a set of signal processing blocks, and to a transmit interface. The article further comprises means in the one or more media for means in the one or more media for analyzing the data stream for an occurrence of a predetermined data pattern. The article further comprises means in the one or more media for means in the one or more media for automatically adding and/or removing one or more signal processing blocks from the set of signal processing blocks upon the occurrence of the predetermined data pattern.

DESCRIPTION OF THE DRAWINGS

Features of example implementations of the invention will become apparent from the description, the claims, and the accompanying drawings in which:

DETAILED DESCRIPTION

Figure 1:
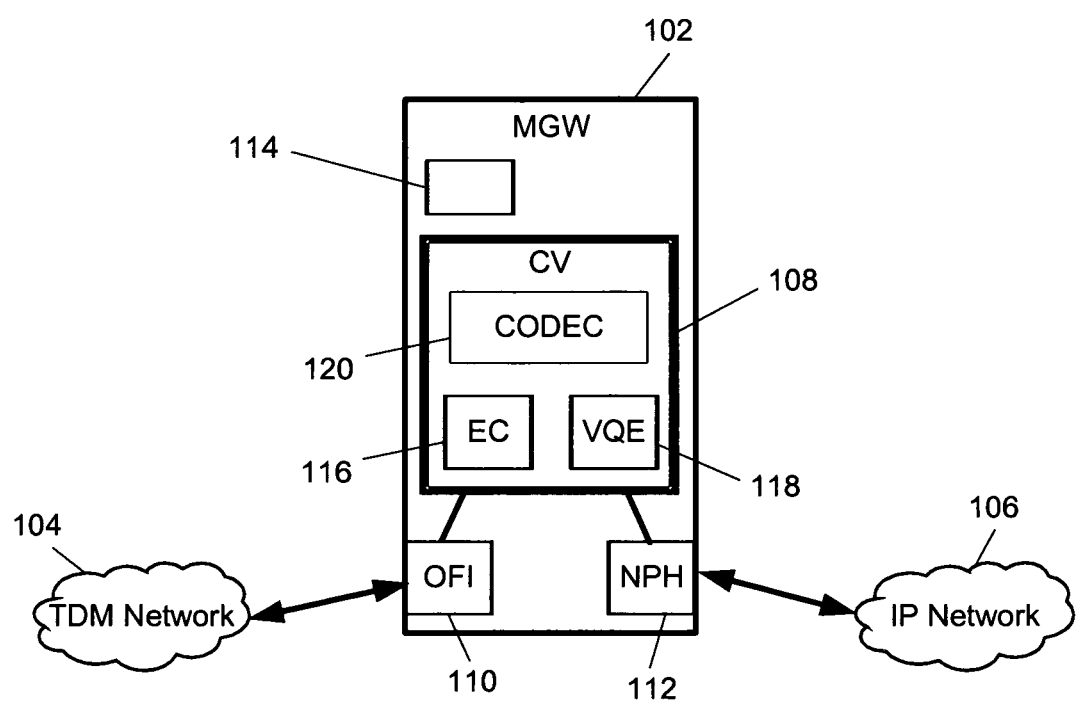
FIG. 1 is a representation of one implementation of an apparatus that comprises a network infrastructure device, a circuit-switched network, and a packet-switched network.

Turning to FIG. 1, an apparatus 100 in one example comprises a network infrastructure device 102, a circuit-switched network 104, and a packet-switched network 106. The network infrastructure device 102 in one example comprises a media gateway (MGW), interactive voice response (IVR) system, packet switch, border gateway controller, or other device for carrying or passing a bearer channel for a data stream. The MGW 102 in one example comprises a circuit vocoder (CV) 108 and at least two network interfaces 110 and 112. In a further example, the MGW 102 comprises an instance of a recordable data storage medium 114, as described herein. The MGW 102 is communicatively coupled with the circuit-switched network 104 and the packet-switched network 106 by the network interfaces 110 and 112. The network interfaces 110 and 112 in one example are capable of supporting one or more channels and/or communication paths to the networks 104 and 106.

The circuit-switched network 104 in one example comprises a circuit-switched network of a cellular service provider. In a further example, the circuit-switched network 104 comprises a time division multiplexed (TDM) network. For example, the network interface 110 is an optical facility interface (OFI) configured to communicate with the circuit-switched network 104 or network infrastructure devices therein. The packet-switched network 106 in one example comprises a packet-switched network of a cellular service provider. In a further example, the packet-switched network 106 supports one or more of internet protocol (IP), G.711, real-time transport protocol (RTP), or other packet-switched protocols. For example, the network interface 112 is a network protocol handler (NPH) configured to communicate with the packet-switched network 106 or network infrastructure devices therein.

The CV 108 in one example comprises a vocoder and/or converter for passing a data stream between the network interface 110 and the network interface 112. The CV 108 in one example supports one or more bi-directional data streams and both the network interfaces 110 and 112 are capable of functioning as a receive interface and/or transmit interface. For example, the CV 108 is configured to convert a circuit-switched data stream to a packet-switched data stream and vice versa. In this example, the CV 108 comprises a voice over IP (VoIP) channel.

The CV 108 in one example comprises one or more signal processing blocks 116, 118, and 120. The CV 108 passes a data stream through a set of the signal processing blocks, where the set comprises zero (i.e., empty set) or more of the signal processing blocks 116, 118, and 120. Examples of the signal processing blocks 116, 118, and 120 comprise codecs (CODEC) for audio or video, echo cancellation (EC or ECAN), voice quality enhancement (VQE), teletypewriter/telecommunication device for the deaf (TTY/TDD), acoustic echo control (AEC), automatic gain control (AGC), dynamic gain (DGAIN), tone detection, and silence suppression (voice activity detection/comfort noise generation, VAD/CNG). Examples of audio codecs comprise EVRC, EVRC-B, AMR, G.711, G.729ab, and G.726. Examples of video codecs comprise MPEG-4 codecs, H.263, and H.264 codecs. Further examples of signal processing blocks, audio codecs, and video codecs will be apparent to those skilled in the art. In alternate implementations, the MGW 102 passes a data stream between two packet-switched networks and the CV 108 is implemented as a packet vocoder or other transcoder. In this implementation, the MGW 102 may still utilize one or more of the signal processing blocks 116 and 118 for processing the data stream.

The CV 108 in one example is configured to analyze data streams that it passes between the interfaces 110 and 112 for an occurrence of a predetermined data pattern. Upon the occurrence of the predetermined data pattern, the CV 108 is configured to automatically add and/or remove one or more signal processing blocks from the set of signal processing blocks. The CV 108 in one example adds or removes the signal processing blocks by enabling, disabling, turning on/off, bypassing, or routing signals to, from, or around the signal processing blocks. In a first example, the CV 108 removes one or more signal processing blocks from the set to create a clear channel for the data stream. In a second example, the CV 108 removes a first signal processing block and adds a second signal processing block upon the occurrence. In a third example, the CV 108 changes the audio codec used for the data stream. Other combinations of adding, removing, or changing codecs will be apparent to those skilled in the art.

In another implementation, the CV 108 is configured to analyze the data streams for an occurrence of any of a plurality of predetermined data patterns. In this implementation, the CV 108 is configured to select which signal processing blocks will be added/removed from the set based on the predetermined data pattern analyzed in the data stream. For example, a first predetermined data pattern corresponds to adding an echo cancellation block and removing a tone detection block, while a second predetermined data pattern corresponds to removing all signal processing blocks. Other combinations will be apparent to those skilled in the art.

Figure 2:
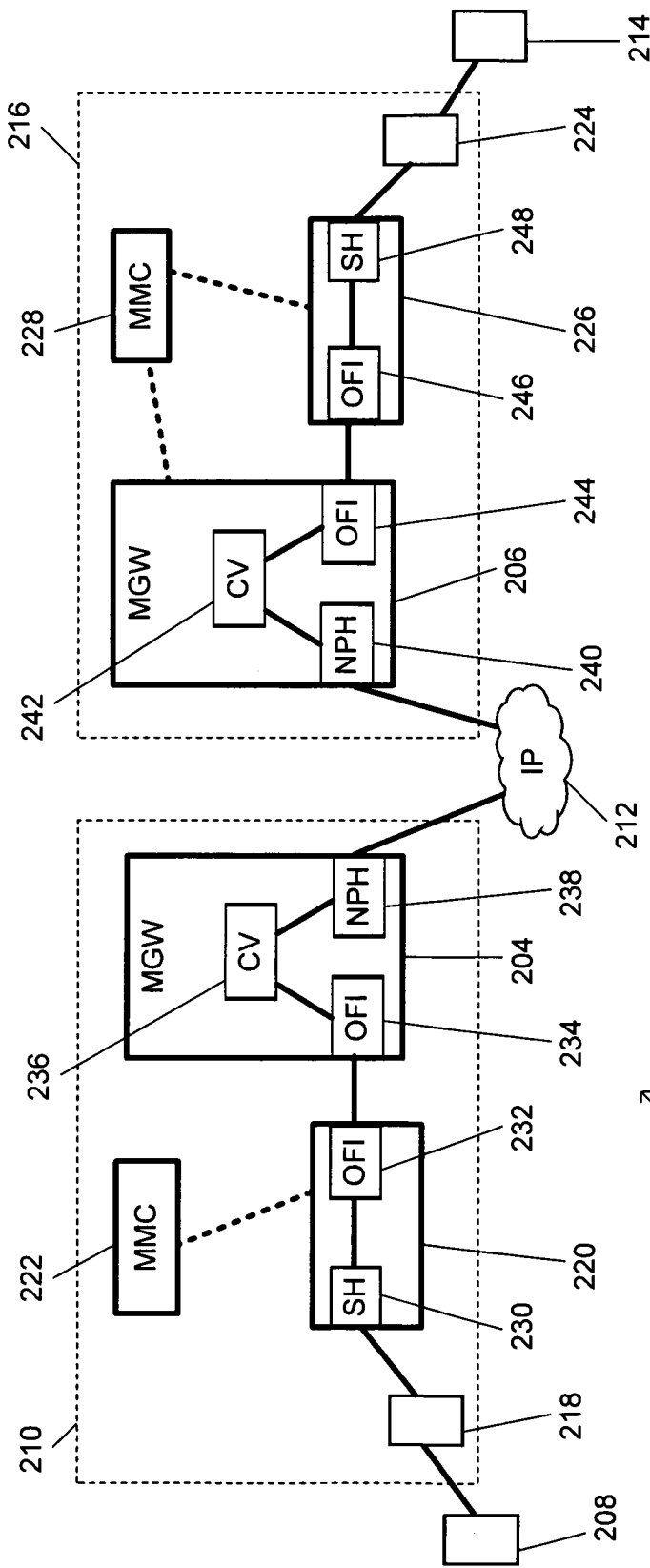
FIG. 2 is a representation of one implementation of a bearer path for the apparatus of FIG. 1.

An illustrative description of operation of the apparatus 100 is presented, for explanatory purposes. Turning to FIG. 2, a bearer path 202 is shown for one implementation of the apparatus 100 with two instances of the network infrastructure device 102 as media gateways (MGW) 204 and 206. The bearer path is from a mobile phone 208 in a cellular network 210, through a packet-switched network 212, and to a mobile phone 214 in a cellular network 216. The cellular network 210 comprises a base station 218, a mobile switching center 220, and a mobility multimedia controller (MMC) 222. The cellular network 216 comprises a base station 224, a mobile switching center 226, and an MMC 228. In one example, the mobile phones 208 and 214 communicate with the base stations 218 and 224 using an enhanced variable rate codec (EVRC), respectively.

A speech handler (SH) 230 of the mobile switching center 220 receives a data stream from the mobile phone 208 and base station 218 and outputs the data stream on a circuit-switched interface, for example, optical facility interface (OFI) 232. The MGW 204 receives the data stream from the MSC 220 on an OFI 234 (e.g., a receive interface), processes the data stream with a circuit vocoder (CV) 236 to convert the data stream from circuit-switched to packet-switched (as described above), and outputs the data stream to the packet-switched network 212 through a network protocol handler (NPH) 238 (e.g., a transmit interface). An NPH 240 (e.g., receive interface) of the MGW 206 receives the data stream from the packet-switched network 212, performs analogous processing with a CV 242 to convert the data stream back into a circuit-switched data stream, and outputs the data stream to the MSC 226 through an OFI 244 (e.g., transmit interface). The MSC 226 passes the data stream from an OFI 246 to an SH 248 and towards the mobile phone 214 through the base station 224. In one example, communication links/trunks between the OFIs 232, 234, 244, and 246 are TDM links and communication links/trunks between the NPHs 238 and 240 are IP links. In alternative implementations, the speech handlers 230 and 248 provide transcoding between packet-switched streams and circuit-switched streams. Additional packet protocols such as SONET or ATM will be apparent to those skilled in the art.

In a first channel mode, the bearer path for the data stream includes one or more signal processing blocks in the MGWs 204 and 206, for example, echo cancellation and voice quality enhancement. A user of the mobile phone 208 in one example initiates an encrypted session for the data stream, for example, using an intersystem link protocol (ISLP). The MGWs 204 and 206 in one example detect the occurrence of the ISLP datagrams through their analysis of the data stream. Examples of the predetermined data pattern comprise a flag inside of an ISLP datagram, a sequence of flags, packet or frame headers/tails, or other data patterns. In one example, the predetermined data pattern is an ISLP flag of 0x7E, used for a frame head and frame tail, as will be appreciated by those skilled in the art. In a further example, the predetermined data pattern is sequence of ISLP flags, such as fifty consecutive flags within one datagram or spanning one or more datagrams with the 0x7E flags. In one example, a pattern matching algorithm for the predetermined data pattern employed by the network infrastructure device is more efficient, has lower delay, and less complexity than a tone detection algorithm.

Upon the detection of the predetermined data pattern, the MGWs 204 and 206 automatically add and/or remove one or more signal processing blocks from the bearer path 202. For example, the MGWs 204 and 206 change to a second channel mode (i.e., clear channel mode) by removing the echo cancellation and voice quality enhancement processing blocks from the set of signal processing blocks, as described above. The MGWs 204 and 206 in one example switch from the first channel mode to the second channel mode without signaling from the MMC 222 or 228, as will be appreciated by those skilled in the art. In other implementations, additional instances of the network infrastructure device 102 are located in the bearer path 202 between the MGWs 204 and 206, for example, within the packet-switched network 212. These additional instances also perform the switch from the first channel mode to the second channel mode upon detection of the predetermined data pattern.

Where the user of the mobile phone 208 initiates the encrypted session, the network 210 is an originating network and the network 216 is a terminating network for the session. The network 216 in one example is located remotely from the network 210 and may not have a signaling relationship able to communicate the start of the encrypted session. In one example, the MGW 206 is configured to send a notification message to the MMC 228 to indicate the start of the encrypted session or the change to the second channel mode. For an ISLP session, this allows the MC 228 to instruct the SH 248 to perform processing necessary for supporting the ISLP session, as will be appreciated by those skilled in the art.

The network infrastructure device 102 and MGWs 204 and 206 provide autonomous switching to a "clear-channel mode" without a need for out-of-band signaling, higher level board or system controller intervention. Since the detection is directly in the data stream (i.e., bearer stream), it provides a fast response and switch to clear-channel mode, thereby potentially improving voice quality (e.g. fewer or no dropped/corrupted packets while switching modes).

The apparatus 100 in one example comprises a plurality of components such as one or more of electronic components, hardware components, and computer software components. A number of such components can be combined or divided in the apparatus 100. An example component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more implementations of the invention. Examples of a computer-readable signal-bearing medium for the apparatus 100 comprise the recordable data storage medium 114 of the network infrastructure device 102. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. A network infrastructure device for processing a data stream received via a communication channel, the network infrastructure device comprising:
a receive interface and a transmit interface coupled to the communication channel; and
a set of signal processing blocks operationally coupled to the communication channel between the receive interface and the transmit interface;
wherein the network infrastructure device is configured to analyze the data stream to identify an occurrence of a predetermined data pattern;
wherein the network infrastructure device is further configured to operate in a first channel mode by:
performing at least one of adding at least one signal processing block to and removing at least one signal processing block from the set of signal processing blocks operationally coupled to the communication channel upon the occurrence of the predetermined data pattern, and
processing the data stream based on the predetermined data pattern, and
providing the data stream to the transmit interface after processing; and
wherein the network infrastructure device is further configured to operate in a second channel mode by passing the data stream from the receive interface to the transmit interface without processing on a condition that the predetermined data pattern is not identified in the data stream;
wherein the data stream changes from a VoIP session to an intersystem link protocol (ISLP) session; and
wherein the predetermined data pattern is a sequence of ISLP flags.

2. The network infrastructure device of claim 1 further configured to automatically remove the set of signal processing blocks to create a clear channel for the data stream from the receive interface to the transmit interface.

3. The network infrastructure device of claim 1, further comprising a circuit vocoder;
wherein the receive interface comprises a circuit-switched interface and the transmit interface comprises a packet-switched interface.

4. The network infrastructure device of claim 1, further comprising a circuit vocoder;
wherein the receive interface comprises a packet-switched interface and the transmit interface comprises a circuit-switched interface.

5. The network infrastructure device of claim 1 further configured to select one or more signal processing blocks to be added and/or removed from the set of signal processing blocks based on the predetermined data pattern analyzed in the data stream.

6. The network infrastructure device of claim 1, further comprising a media gateway of a cellular communication network;
wherein the communication channel is a bearer channel for a cellular communication session;
wherein the receive and transmit interfaces are configured as one of:
a G.711 voice over internet protocol (VoIP) interface and a time division multiplex (TDM) interface, respectively; or
a TDM interface and a G.711 VoIP interface, respectively.

7. The network infrastructure device of claim 6, wherein the media gateway is configured to automatically send an indicator to a terminating mobility multimedia controller upon the occurrence of the predetermined data pattern for further handling of the data stream by a speech handler.

8. The network infrastructure device of claim 6, wherein the set of signal processing blocks comprises one or more of:
echo cancellation, voice quality enhancement, teletypewriter/telecommunication device for the deaf, acoustic echo control, automatic gain control, dynamic gain, tone detection, silence suppression, voice activity detection, comfort noise generation, and an audio codec.

9. The network infrastructure device of claim 8, wherein the audio codec comprises one or more of EVRC, EVRC-B, AMR, G.711, G.729ab, and G.726; and
wherein the network infrastructure device is further configured to automatically change the audio codec for the data stream upon the occurrence of the predetermined data pattern.

10. The network infrastructure device of claim 1, wherein the predetermined data pattern comprises at least one of: a flag inside of an intersystem link protocol (ISLP) datagram, a sequence of flags, a packet header, a packet tail, a frame header, and a frame tail.

11. The network infrastructure device of claim 1, further configured to remove a tone detection signal processing block and add an echo cancellation signal processing block.

12. The network infrastructure device of claim 1, wherein the network infrastructure device is configured to automatically remove at least two signal processing blocks from and/or add at least two signal processing blocks to the set of signal processing blocks upon the occurrence of the predetermined data pattern and based on the predetermined data pattern.

13. A method performed by a network infrastructure device comprising a receive interface, a transmit interface, and a set of signal processing blocks connected between the receive and transmit interfaces, the method comprising:
  passing a data stream for a bearer channel from the receive interface, via a communication channel, through the set of signal processing blocks, and to the transmit interface, wherein the receive interface and the transmit interface are operationally coupled to the communication channel;
  analyzing the data stream to identify an occurrence of a predetermined data pattern; and
  automatically performing at least one of adding at least one signal processing block to, and removing at least one signal processing block from the set of signal processing blocks operationally coupled to the communication channel upon the occurrence of the predetermined data pattern and based on the predetermined data pattern;
  wherein a session supported by the bearer channel changes from a voice over internet protocol (VoIP) session to an intersystem link protocol (ISLP) session on a condition that the predetermined data pattern comprises a sequence of ISLP flags.

14. The method of claim 13, further comprising:
  automatically removing the set of signal processing blocks to create a clear channel for the data stream from the receive interface to the transmit interface.

15. The method of claim 13, wherein the passing comprises:
  converting the data stream between a circuit-switched data stream and a packet-switched data stream.

16. The method of claim 15, wherein the converting comprises:
  converting the data stream between a time division multiplexed (TDM) stream and a G.711 VoIP packet stream.

17. The method of claim 13 further comprising:
  selecting at least one signal processing block to be added to and/or removed from the set of signal processing blocks based on the predetermined data pattern detected in the data stream.

18. The method of claim 13, further comprising:
  sending an indicator to a terminating mobility multimedia controller upon the occurrence of the predetermined data pattern for further handling of the data stream by a speech handler.

19. The method of claim 13, wherein the data stream changes from a VoIP session to an intersystem link protocol (ISLP) session, and wherein the predetermined data pattern comprises a sequence of ISLP flags.

20. The method of claim 13, wherein the at least a first signal processing block comprises one or more audio codecs, wherein the automatically adding and removing comprises:
  automatically changing one or more of the audio codecs used for the data stream.

21. The method of claim 13, wherein the predetermined data pattern comprises at least one of: a flag inside of an intersystem link protocol (ISLP) datagram, a sequence of flags, a packet header, a packet tail, a frame header, and a frame tail.

22. The method of claim 13, further comprising removing a tone detection signal processing block and adding an echo cancellation signal processing block.

23. A method of transmitting a data stream over a communication channel established in a communication network over one or more network infrastructure devices, the method comprising, at each network infrastructure device:
  analyzing the data stream received from the network over a receive interface, to identify an occurrence of a predetermined data pattern;
  on a condition that the predetermined data pattern is not identified by the network infrastructure device, passing the data stream from the receive interface to a transmit interface without processing the data stream;
  on a condition that the predetermined data pattern is identified, processing the data stream based on the predetermined data pattern and providing the processed data stream to the network over the transmit interface after processing,
  wherein processing the data stream comprises automatically performing at least one of adding at least one signal processing block to, and removing at least one signal processing block from a set of signal processing blocks operationally coupled between the receive and transmit interface;
  wherein the data stream changes from a VoIP session to an intersystem link protocol (ISLP) session; and
  wherein the predetermined data pattern is a sequence of ISLP flags.

24. The method of claim 23, wherein processing the data stream based on the predetermined data pattern comprises converting the data stream between a circuit-switched data stream and a packet-switched data stream.

25. The method of claim 23, wherein processing the data stream based on the predetermined data pattern comprises converting the data stream between a time division multiplexed (TDM) stream and a G.711 VoiP packet stream.

26. The method of claim 23, wherein the predetermined data pattern comprises at least one of: a flag inside of an intersystem link protocol (ISLP) datagram, a sequence of flags, a packet header, a packet tail, a frame header, and a frame tail.

* * * * *